(12) United States Patent
Takano et al.

(10) Patent No.: US 7,031,712 B2
(45) Date of Patent: Apr. 18, 2006

(54) MOBILE COMMUNICATION CONTROL METHOD AND SYSTEM AND MOBILE STATION THEREOF

(75) Inventors: Nahoko Takano, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 519 days.

(21) Appl. No.: 09/989,662

(22) Filed: Nov. 21, 2001

(65) Prior Publication Data

US 2002/0061731 A1   May 23, 2002

(30) Foreign Application Priority Data

Nov. 22, 2000   (JP) ............................. 2000-355124

(51) Int. Cl.
*H04Q 7/20*   (2006.01)

(52) U.S. Cl. ...................... 455/442; 455/436; 455/439; 455/443; 455/437

(58) Field of Classification Search ................ 455/436, 455/437, 439, 442, 443, 525, 67.11, 69, 522, 455/524, 561
See application file for complete search history.

(56) References Cited

U.S. PATENT DOCUMENTS 5,268,933 A * 12/1993 Averbuch ................... 375/356

(Continued)

FOREIGN PATENT DOCUMENTS

JP   11-69416   3/1999

(Continued)

OTHER PUBLICATIONS

3G TS 25.214 v3.2.0 (Mar. 2000),.3$^{rd}$ Generation Partnership Project; Technical Specification Group Radio Access Network; Physical layer procedure (FDD), Release 1999, pp. 19 5.2.1.4.

(Continued)

*Primary Examiner*—Curtis Kuntz
*Assistant Examiner*—Tuan Pham
(74) *Attorney, Agent, or Firm*—Sughrue Mion, PLLC

(57) ABSTRACT

In case of making site selection diversity transmit power control, all handover base stations are enabled for transmission depending on a state of the transmission power value of a dedicated data signal from the base stations, thereby preventing a trafic capacity from decreasing due to an increase in the transmission power of a dedicated control signal at a non-transmitting base station, or a received signal quality from degrading at a mobile station because the transmission power value of the transmitting base station reaches a maximum transmission power of base station. A mobile station measures a common pilot signal and a dedicated control signal transmitted from each handover base station by means of a receiving monitor, estimates the transmission power value of the dedicated control signal at each handover base station from a difference thereof, and estimates a difference in the transmission power value of the dedicated control signal between the handover base stations. In the case where this difference is greater than or equal to a predetermined threshold value, a transmitting base station designating section designates all of the handover base stations to be enabled for transmission.

16 Claims, 10 Drawing Sheets

U.S. PATENT DOCUMENTS

| | | | | |
|---|---|---|---|---|
| 5,854,785 A | * | 12/1998 | Willey | 370/332 |
| 5,926,470 A | * | 7/1999 | Tiedemann, Jr. | 370/334 |
| 6,173,162 B1 | * | 1/2001 | Dahlman et al. | 455/69 |
| 6,256,501 B1 | * | 7/2001 | Tokuyama et al. | 455/442 |
| 6,434,367 B1 | * | 8/2002 | Kumar et al. | 455/70 |
| 6,487,191 B1 | * | 11/2002 | Kang et al. | 370/342 |
| 6,628,957 B1 | * | 9/2003 | Weaver et al. | 455/522 |
| 6,667,961 B1 | * | 12/2003 | Park et al. | 370/331 |
| 6,725,043 B1 | * | 4/2004 | Bonta et al. | 455/437 |

FOREIGN PATENT DOCUMENTS

WO      WO 99/13675 A1      3/1999

OTHER PUBLICATIONS

"Universal Mobile Telecommunications System (UMTS); Physical layer procedures (FDD); (3G TS 25.214 version 3.2.0 Release 1999); ETSI TS 125 214"; ETSI Standards, European Telecommunications Standards Institute, Sophia-Antipo, FR, vol. 3-R1, No. V320, Mar. 2000; chapter 5.2.1.4.

Hamabe K et al.: "Forward-link Power Control Utilizing Neighboring-cell Pilot Power for DS-CDMA Cellular Systems"; Vehicular Technology Conference, 1997, IEEE 47$^{th}$ Phoenix, AZ, USA May 4-7, 1997, New York, NY, USA, IEEE, US, May 4, 1997, pp. 939-943, section II.

* cited by examiner

MOBILE COMMUNICATION CONTROL METHOD AND SYSTEM AND MOBILE STATION THEREOF

BACKGROUND OF THE INVENTION

1. Field of the Invention

The present invention relates to a mobile communication control method and system and a mobile station, and more particularly to a system for determining a base station for transmission during hand-over in a cellular communication system.

2. Description of the Prior Art

In a cellular system employing a direct sequence code division multiple access, since a same frequency band is used by a plurality of channels, transmission for other channels makes interference, in which if interference is increased, the received signal quality of desired signal is degraded, causing a disconnection of a link. Accordingly, the trafic capacity, that is, the number of links capable of making communications while retaining a certain speech quality, depends on the amount of interference.

Therefore, in a downlink of the cellular system employing the direct sequence code division multiple access, a transmission power value of the base station is controlled to be the minimum transmission power value so that the received signal quality at the mobile station can retain a reference level. This involves a closed loop control of measuring the received signal quality at the mobile station, and transmitting a signal for instructing to decrease the transmission power value if it is above a predetermined target value, or transmitting a signal for instructing to increase the transmission power value if it is below the predetermined target value.

Typically, in the cellular system employing the direct sequence code division multiple access, a soft handover is employed. With this soft handover, when the mobile station comes near the cell boundary of a connecting base station, with a difference in propagation loss between the connecting base station and its adjacent base station below a certain value, the link is set with the adjacent base station to make connection at the same time. Thereby, a site diversity effect for allowing the transmission from a plurality of base stations can be obtained even in an area with a large propagation loss near the cell boundary, whereby the received signal quality is prevented from degrading, and the uninterrupted handover can be realized by setting in advance the link with a next base station to connect.

However, since in the soft handover a plurality of base stations are transmitted to one mobile station, there is a problem with the soft handover that interference increases in the downlink, and the trafic capacity decreases. As a technique to solve such a problem, a site selection diversity transmit power control system was disclosed in Japanese Patent Laid-Open No. 11-69416 in which the trafic capacity in the downlink was increased by designating a base station for actually performing the transmission among a group of base stations during the soft handover.

In this site selection diversity transmit power control system, the mobile station determines the base station with the least propagation loss and the base stations of which differences in propagation losses between the least propagation loss are below a predetermined threshold value, among the handover base stations, as the transmitting base stations. Them, the mobile station notifies the transmitting base station to the handover base stations. In the handover base stations, when the base station is not designated as the transmitting base station in accordance with a notification from the mobile station, that is, the non-transmitting base station, the transmission of the base station is stopped, whereby the interference on the downlink is suppressed.

Moreover, in the site selection diversity transmit power as described in "3G TS 25.214 v3.2.0 (2000–03) $3^{rd}$ Generation Partnership Project: Technical Specification Group Radio Access Network; Physical layer procedures (FDD) pp.19 5.2.1.4", among a dedicated control signal and a dedicated data signal which the base stations under communication transmit to the mobile station, it is only the dedicated data signal that the non-transmitting base station stops the transmission, and the dedicated control signal is transmitted at a power value under the normal transmission power control of fast closed loop type. Also, the power value of the dedicated data signal according to the transmission power control is always retained even at the non-transmission base station.

With these measures, synchronization is assured at the non-transmission base station, and the dedicated data signal can be transmitted at a power value according to the transmission power control of fast closed loop type immediately after being switched to the transmitting base station, whereby the communication quality in switching can be enhanced.

However, in the transmission power control of fast closed loop type, each handover base station receives a signal for instructing to increase or decrease the transmission power value from the mobile station and makes the independent control, whereby in some cases each handover base station has a different transmission power value due to a signal reception error.

Furthermore, the transmission power control of fast closed loop type, which is made so that the dedicated data signal at the mobile station has a predetermined received signal quality, has no effect on determining the signal for instructing to increase or decrease the transmission power value at the mobile station even in the case where the non-transmitting base station transmits the dedicated control signal at an excessive transmission power value, whereby the non-transmitting base station continues the transmission at the excessive transmission power value. This will be set forth in detail by reference to FIGS. 9 and 10.

FIGS. 9 and 10 represent the transmission power values of the handover base stations BS1 and BS2, and the total transmission power value of two base stations with the elapse of time. FIG. 9 involves an instance of the soft handover under the normal transmission power control, and FIG. 10 involves an instance of the handover under the site selection diversity transmit power control system. In each of FIGS. 9 and 10, the solid line represents the dedicated data signal, and the dotted line represents the dedicated control signal.

The mobile station transmits a transmission power control signal to the handover base stations, to instruct to decrease the transmission power value when a receiving SIR (signal to interference power ratio) of the dedicated data signal to be received is higher than the target SIR, or instruct to increase the transmission power value when it is lower than the target SIR, whereby each base station increases or decreases the transmission power value for the dedicated data signal and the dedicated control signal in accordance with the transmission power control signal. The transmission power control signal is received by each base station to control the transmission power value independently, whereby there is a difference in the transmission power value between handover base stations due to a reception error at the base station.

FIGS. 9 and 10 shows an instance where a reception error occurs at the base station BS2 during T1–T2 and generates a difference in the transmission power values. In a case of the normal soft handover as shown in FIG. 9, if the transmission power value of the base station BS2 is higher, the total transmission power value of the dedicated data signal for the mobile station is increased, so that the reception SIR at the mobile station exceeds the target SIR, and the base station BS2 is instructed to decrease the transmission power value using the transmission power control signal. Therefore, the base stations BS1 and BS2 decrease the transmission power value, thereby reducing the total transmission power value in transmission.

On one hand, in a case of the handover in the site selection diversity transmit power control system as shown in FIG. 10, a transmission base station BS1 transmits both the dedicated control signal and the dedicated data signal, while a non-transmission base station BS2 transmits only the dedicated control signal, and does not transmit the dedicated data signal. Hence, the base station BS2 produces a reception error during T1–T2, so that the total transmission power value of the dedicated data signal to the mobile station is not increased even if the transmission power value is higher. Accordingly, the reception SIR of the dedicated data signal at the mobile station is not increased, and no transmission power control signal is sent for instructing to decrease the higher transmission power value due to a reception error at the base station BS2. Therefore, the transmission power of the dedicated control signal at the non-transmission base station remains high.

In this state, though the non-transmitting base station stops the transmission of dedicated data signal to decrease the transmission power value, the total transmission power value transmitted by the base stations during the handover is increased owing to an increased transmission power value of the dedicated control signal. Therefore, the interference on the other mobile stations increases and the trafic capacity decreases. In particular, in the case where the transmission rate is slower, the transmission power distribution of the dedicated control signal is greater, causing a more significant influence.

With the site selection diversity transmit power control, the number of base stations for transmission is smaller than in the normal soft handover, bringing about a problem that if there is a significant propagation loss, the received signal quality may be insufficient and degraded even if the transmission power value is increased to the maximum transmission power value of the base station.

BRIEF SUMMARY OF THE INVENTION

Accordingly, the present invention has been achieved to solve the above-mentioned problems, and it is an object of the invention to provide a mobile communication control method and system in which the trafic capacity is increased by suppressing the interference and the received signal quality is improved in such a manner that the base station is not selected and all of the handover base stations are enabled for transmission in the case where interference to other mobile stations is increased or the received signal quality of the link is degraded by selecting the base station.

In order to attain the above object, according to a mobile communication control method of the present invention, there is provided a mobile communication control method in which a mobile station sets a link with one or more base stations, comprising the steps of: measuring a received signal quality of a pilot signal transmitted from each of the base station with which the mobile station has set the link (hereinafter referred to as active set base station); determining one or more transmitting base stations from among the active set base stations in accordance with the measured results; and notifying the determined result to the active set base stations, in which all of the active set base stations are enabled for transmission depending on a state of the transmission power value from the transmitting base stations.

The mobile communication control method according to the invention further comprises a step of the mobile station estimating a transmission power value of the dedicated control signal transmitted by the active set base station, in which all of the active set base stations are enabled for transmission, in the case where an estimated value of the transmission power value of the active set base station other than the transmitting base stations is greater than or equal to a predetermined threshold value for the estimated value of transmission power value of the transmitting base station or a difference between the transmission power value of the transmitting base station and the maximum transmission power value of base station that is preset is below a predetermined threshold value.

Also, the mobile communication control method according to the invention further comprises a step of the mobile station measuring the received signal quality of the dedicated data signal transmitted from the transmitting base station, in which all of the active set base stations are enabled for transmission in the case where the received signal quality is less than a predetermined signal quality.

According to another aspect of the invention, there is provided a cellular system in which a mobile station sets a link with one or more base stations, the system measuring the received signal quality of a pilot signal transmitted from the active set base station, determining one or more transmitting base stations from among the active set base stations in accordance with the measured results, and notifying the determined result to the active set base stations, in which all of the active set base stations are enabled for transmission depending on a state of the transmission power value from the one or more transmitting base stations.

In the cellular system according to the invention, the mobile station estimates a transmission power value of the dedicated data signal transmitted by the active set base station, in which all of the active set base stations are enabled for transmission, in the case where an estimated value of the transmission power value of the active set base station other than the transmitting base stations is greater than or equal to a predetermined threshold value for the estimated value of transmission power value of the transmitting base station, or a difference between the transmission power value of the transmitting base station and the maximum transmission power value of base station that is preset is smaller than or equal to a predetermined threshold value.

Also, in the cellular system according to the invention, the mobile station measures the received signal quality of the dedicated data signal transmitted from the transmitting base station, in which all of the active set base stations are enabled for transmission, in the case where the received signal quality is less than a predetermined signal quality.

According to another aspect of the invention, there is provided a mobile station which sets a link with one or more base stations, the mobile station measuring the received signal quality of a pilot signal transmitted from the active set base station, determining one or more transmitting base stations from among the active set base stations in accordance with the measured results, and notifying the determined result to the active set base stations, in which all of the active set base stations are enabled for transmission depending on a state of the transmission power value of the transmitting base stations.

The mobile station according to the invention estimates a transmission power value of the dedicated data signal transmitted by the active set base station, in which all of the active set base stations are enabled for transmission in the case where an estimated value of the transmission power value of the active set base station other than the transmitting base stations is greater than or equal to a predetermined threshold value for the estimated value of transmission power value of the transmitting base stations or a difference between the transmission power value of the transmitting base station and the maximum transmission power value of base station that is preset is smaller than or equal to a predetermined threshold value.

Also, the mobile station according to the invention measures the received signal quality of the dedicated data signal transmitted from the transmitting base station, in which all of the active set base stations are enabled for transmission in the case where the received signal quality is less than a predetermined signal quality.

DETAILED DESCRIPTION OF THE PREFERRED EMBODIMENTS

The preferred embodiments of the present invention will be described below by reference to the accompanying drawings. In this embodiment, a mobile station sets a link with one or more base stations, measures the received power of a pilot signal transmitted by the base station setting the link, determines a transmitting base station for making the transmission in accordance with the measured result, and notifies the determined result to the base station setting the link. The base station setting the link transmits a dedicated control signal and a dedicated data signal to the mobile station in accordance with a notification from the mobile station, when the base station is the transmitting base station, while the base station setting the link transmits only the dedicated control signal to the mobile station, and suspends the dedicated data signal to be transmitted, when the base station is not the transmitting base station. The transmission power value of a handover base station is controlled to be the minimum transmission power value capable of retaining a defined received signal quality at the mobile station under the fast closed loop control.

A feature of this invention is that the site selection diversity transmit power control is stopped and the transmission from all of the base stations is enabled in the case where the mobile station estimates the degraded communication quality or the reduced trafic capacity during the transmission power control of base station selecting type.

Figure 1:
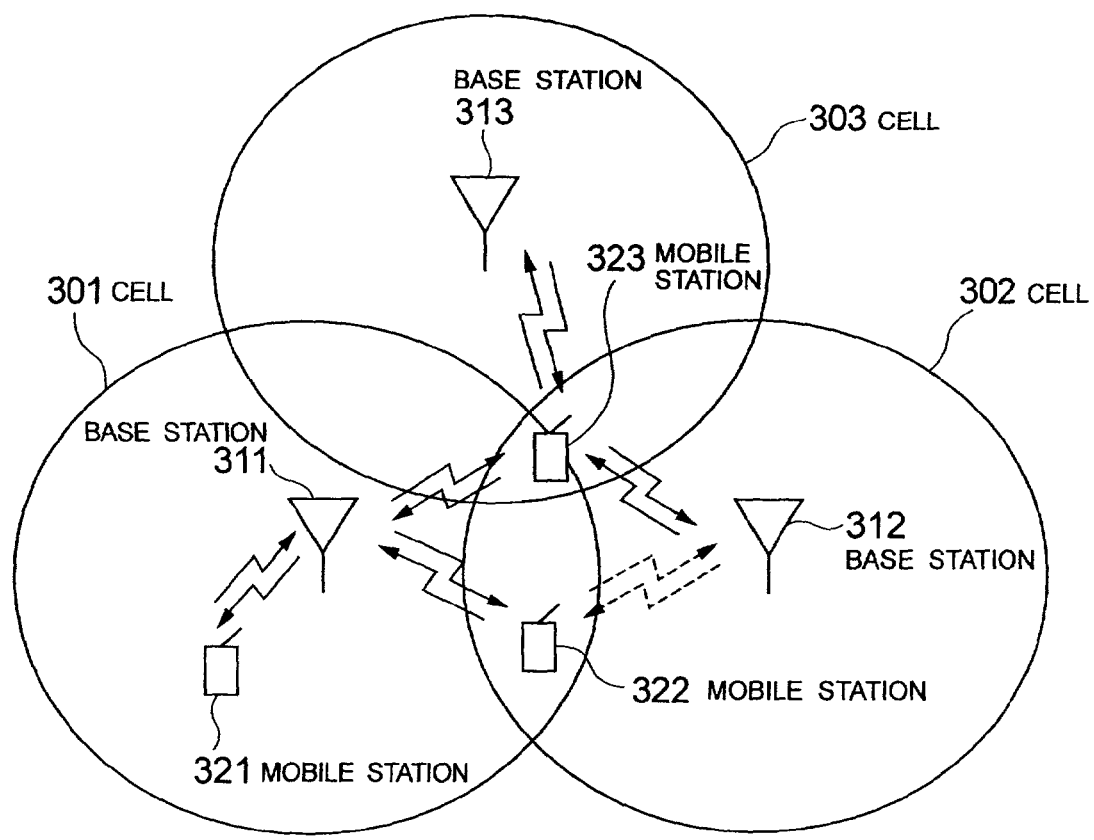
FIG. 1 is a block diagram showing a cellular system to which the present invention is applied.

FIG. 1 is a block diagram of a cellular system to which the present invention is applied. In FIG. 1, the base stations 311 to 313 make the transmission to the mobile stations 321 to 323 within the respective areas of the cells 301 to 303. Each base station transmits a common pilot signal of a predetermined power value to all of the mobile stations within a cell, and a dedicated control signal and a dedicated data signal destined for each mobile station, whose transmission power values are controlled under the transmission power control of fast closed loop type.

The mobile station sets the link with a base station having a maximum received power among the common pilot signals transmitted by the base stations, and with a base station having a difference between the received power of a common pilot signal and the maximum level being within a predetermined threshold value.

A mobile station 321 located near a center of a cell 301 is positioned in the vicinity of a cell center, with the most excellent received power of the common pilot signal transmitted by a base station 311, and a difference in the received power between the common pilot signal transmitted by other base stations and it being outside a predetermined threshold value, and sets the link with the base station 311 only.

Also, a mobile station 322 is located near the boundary of the cells 301 and 302, and a difference in the received power between the common pilot signals transmitted by the base stations 311 and 312 is within a predetermined threshold level, therefore the mobile station 322 sets the links with both base stations 311 and 312 at the same time. However, since the difference is outside a threshold value for determining the transmitting base station, the base station 311 with the most excellent received power only transmits the dedicated control signal and the dedicated data signal, while the base station 312 transmits only the dedicated control signal and suspends the dedicated data signal to be transmitted.

Further, a mobile station 323 is located near the boundary of the cells 301, 302 and 303, and a difference in the received power between the common pilot signals transmitted by the base stations 311, 312 and 313 is within the predetermined threshold level, therefore the mobile station 323 sets the links with all base stations 311–313 at the same time, although this difference in the received power is outside the threshold value for determining the transmitting base station. However, since the transmission power value at the base station lies under predetermined conditions, all of the set base stations setting the links transmit the dedicated control signals and the dedicated data signals.

Figure 2:
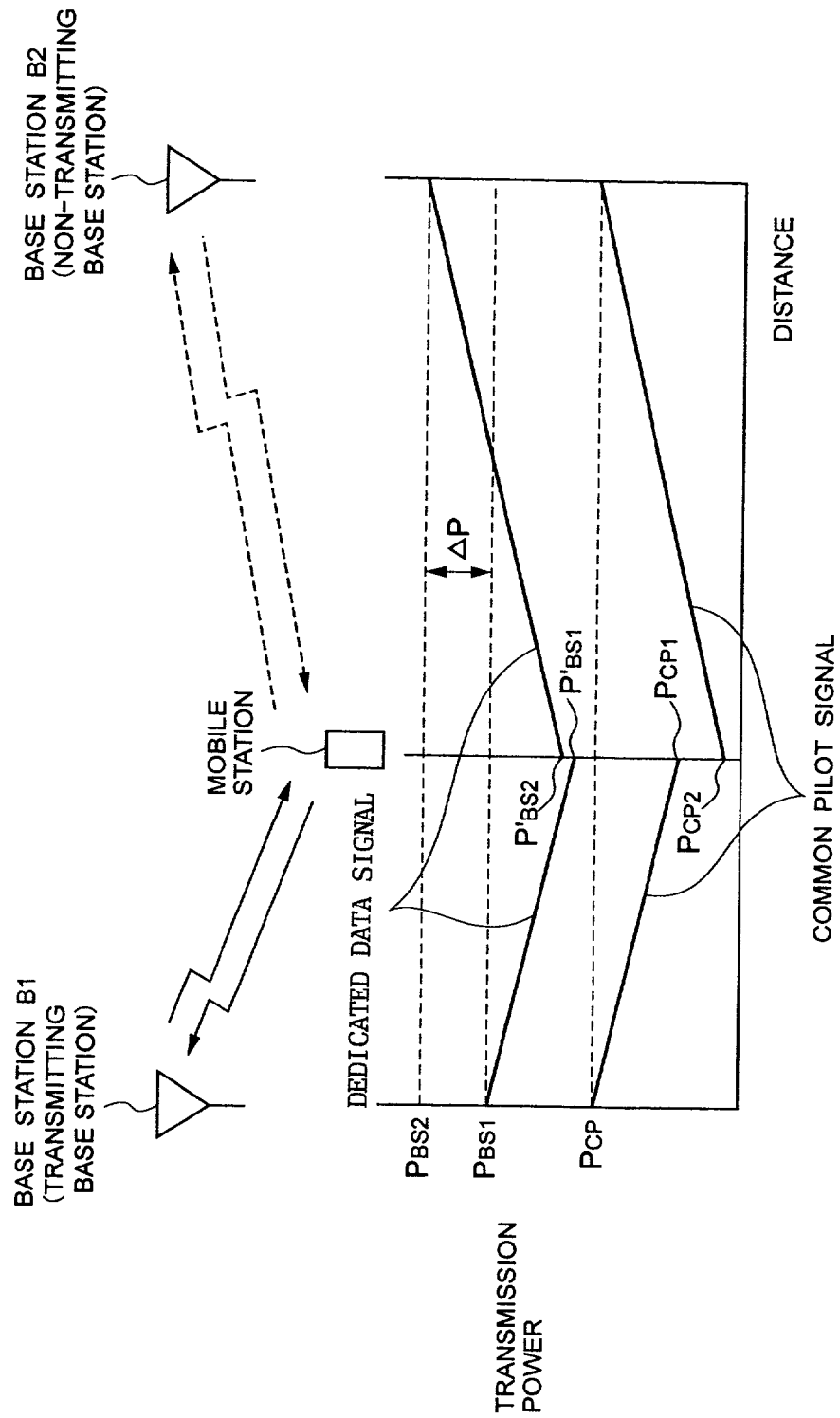
FIG. 2 is a view showing a principle for estimating a transmission power value of a dedicated data signal at a mobile station.

FIG. 2 is a view for explaining a method of estimating the transmission power value of a dedicated data signal transmitted at a power value that is controled by the fast closed loop control at the mobile station. Normally, the mobile station resides at arbitrary location between the handover base stations, and has a different distance from each handover base station. Accordingly, even if the received powers $P'_{BS1}$ and $P'_{BS2}$ of the dedicated data signals from two handover base stations B1 and B2 are at the almost same level at the mobile station, they are not equal to the transmission power levels $P_{BS1}$ and $P_{BS2}$ at the base stations, due to different propagation losses, as shown in FIG. 2.

Thus, in this invention, the received powers $P_{CP1}$ and $P_{CP2}$ of common pilot signals transmitted always at the constant power level are employed. The transmission power value of common pilot signal is always constant, and known at the mobile station. The common pilot signal and the dedicated data signal transmitted from the same base station have the almost same propagation loss, whereby it is possible to estimate the transmission power values $P_{BS1}$ and $P_{BS2}$ at the base stations from a difference in the received power between the common pilot signal and the dedicated data signal received at the mobile station.

A first embodiment of the invention will be described below. A basic principle of the first embodiment of the invention is that in the case where the transmission power value of dedicated control signal transmitted by the non-transmitting base station is greater than that of dedicated control signal transmitted by the transmitting base station to increase the interference on other mobile stations, all base stations setting the links are designated as the transmission base station to transmit the dedicated data signal as well, thereby enhancing the received signal quality of dedicated data signal at the mobile station, and decreasing the transmission power value of dedicated data signal at the base station setting the link under the transmission power control of fast closed loop type to suppress the interference.

Figure 3:
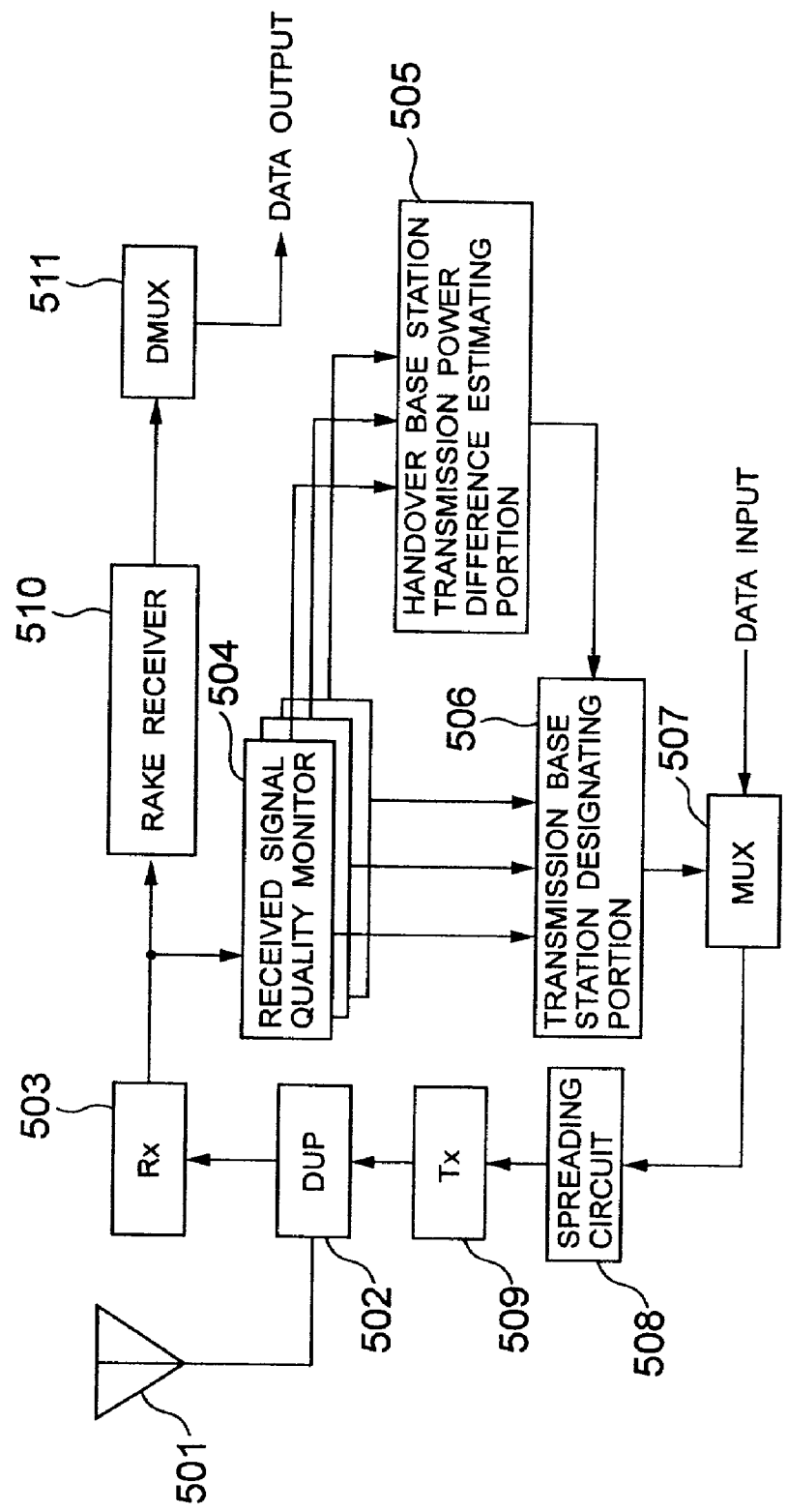
FIG. 3 is a block diagram showing a configuration of a mobile station according to a first embodiment of the invention.

FIG. 3 is a block diagram showing a configuration of the mobile station according to the first embodiment of the invention. In FIG. 3, the mobile station comprises a receiving antenna 501 for receiving a radio signal transmitted from one or more base stations, a transmitting or receiving multiplexer (DUP) 502, a radio receiving portion (Rx) 503 for converting the radio signal into a receiving baseband signal, a received signal quality monitor 504 for measuring the received signal quality by receiving a common pilot signal, and a dedicated control signal from a plurality of base stations, a handover base station transmitted power difference estimating portion 505 for estimating a difference in transmission power value of the dedicated control signal between the handover base stations from the received signal quality of the common pilot signal and the dedicated control signal that is measured, a transmitting base station designating portion 506 for determining and designating the transmitting base station, a multiplexer (MUX) 507 for multiplexing a base station instructing signal and the input data to generate an uplink transmission signal, a spreading circuit 508 for spreading the uplink transmission signal to output a transmission base signal, a radio transmitting portion (Tx) 509 for transmitting a radio signal converted from the transmission base signal, a RAKE receiver 510 for synthesizing the base signals from a plurality of transmitting base stations, and a demultiplexer (DMUX) 511.

The transmitting base station designating portion 506 makes all of the handover base stations the transmitting base station when a difference in the transmission power value of the dedicated control signal estimated by the handover base station transmission power difference estimating section 505 is greater than or equal to the threshold value, while it selects the transmitting base station in accordance with the received signal quality of common pilot signal that is measured, generates a signal indicating the transmitting base station and transmits it to the active set base station, when less than the threshold value.

Figure 4:
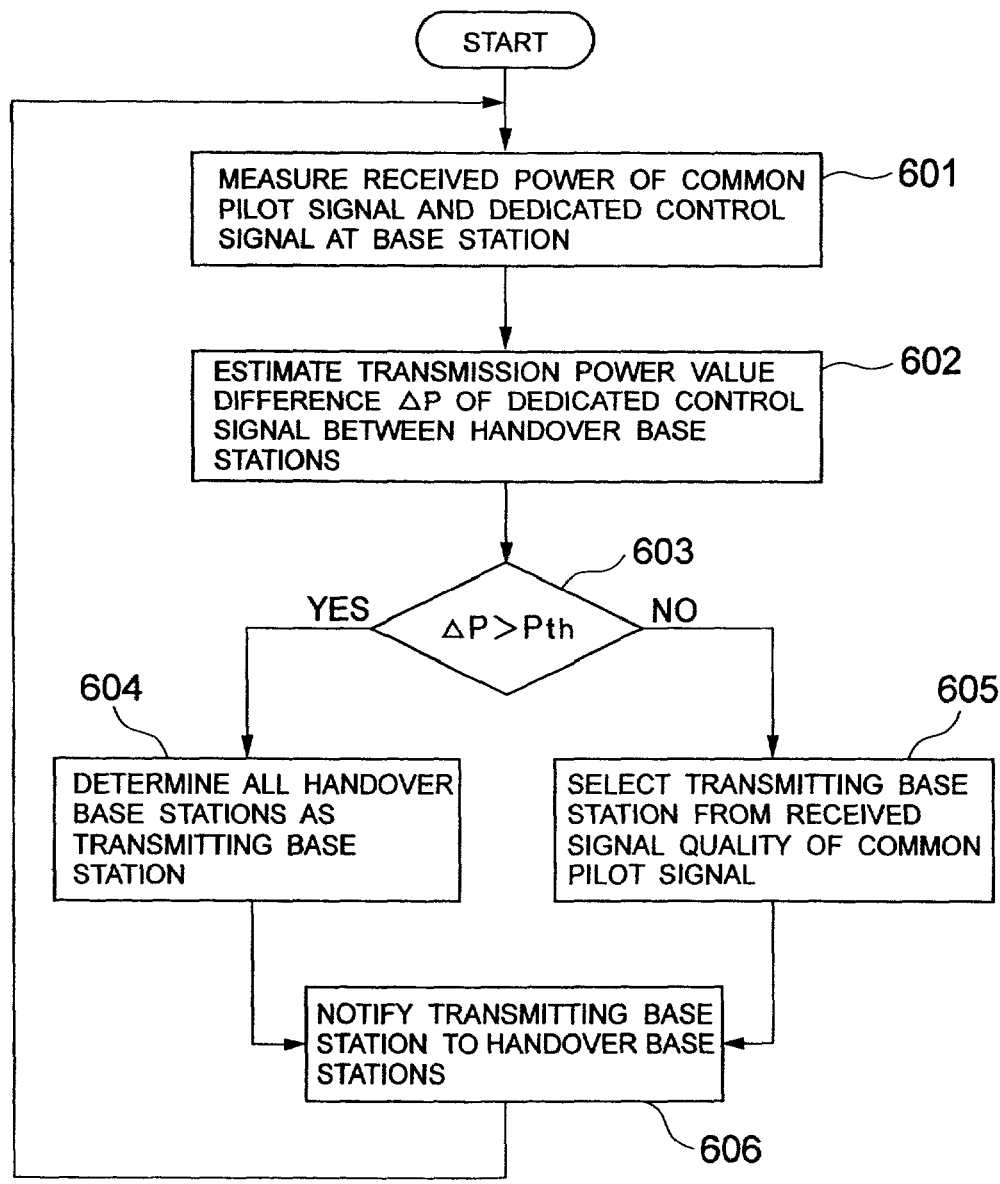
FIG. 4 is a flowchart showing an operation of the mobile station according to the first embodiment of the invention.

FIG. 4 is a flowchart showing the operation at the mobile station according to the first embodiment of the invention. A method of determining the transmitting base station at the mobile station that is performed at a predetermined interval will be described below.

First of all, the mobile station measures the received power of common pilot signal and dedicated control signal transmitted from each handover base station (step 601). On the basis of the measured results, the transmission power value of dedicated control signal transmitted from each handover base station is estimated, and a transmission power value difference $\Delta P$ of dedicated control signals between the handover base stations is estimated (step 602).

This estimated power difference $\Delta P$ is compared with a predetermined threshold value $P_{th}$ (step 603). If this estimated power difference $\Delta P$ is greater than the threshold value $P_{th}$, all of the handover base stations are determined as the transmitting base station (step 604), or otherwise the transmitting base station is selected in accordance with the received signal quality of common pilot signal (step 605). Thereafter, a signal indicating the determined transmitting base station is transmitted through an uplink, and notified to the handover base station (step 606). The mobile station performs the determination of the above transmitting base station at a predetermined time interval.

Also, the base station setting the link receives the signal indicating the transmitting base station transmitted from the mobile station at predetermined time interval, in which if judging that the base station is the transmitting base station, it transmits a dedicated control signal and a dedicated data signal, while if judging that the base station is the non-transmitting base station, it transmits only the dedicated control signal.

In this embodiment, in the case where the dedicated control signal transmitted by the non-transmitting base station increases the interference on the other mobile stations, and decreases the link capacity, the dedicated data signals are transmitted from all of the base stations setting the link, whereby the transmission power value of dedicated data signal from the base station setting the link can be decreased under the transmission power control of fast closed loop type. Accordingly, it is possible to decrease the interference and enhance the trafic capacity.

A second embodiment of this invention will be described below. In the case of the site selection diversity transmit power control system, the transmission is performed with a smaller number of base stations than in the normal soft handover, whereby the transmission power value of dedicated data signal transmitted from one base station is increased in an area with large propagation loss near the cell boundary, with the high possibility of getting to the maximum transmission power value of the base station as defined, and if the maximum value is reached, the transmission power value can not be further increased at the base station, thereby causing a problem that the received signal quality at the mobile station may be degraded. This second embodiment of the invention solves the problem. A basic principle is that the transmission power value of the transmitting base station is estimated at the mobile station, and when it is close to the maximum transmission power value of the base station, the transmission is enabled from all of the base stations, thereby preventing the signal degradation at the mobile station.

Figure 5:
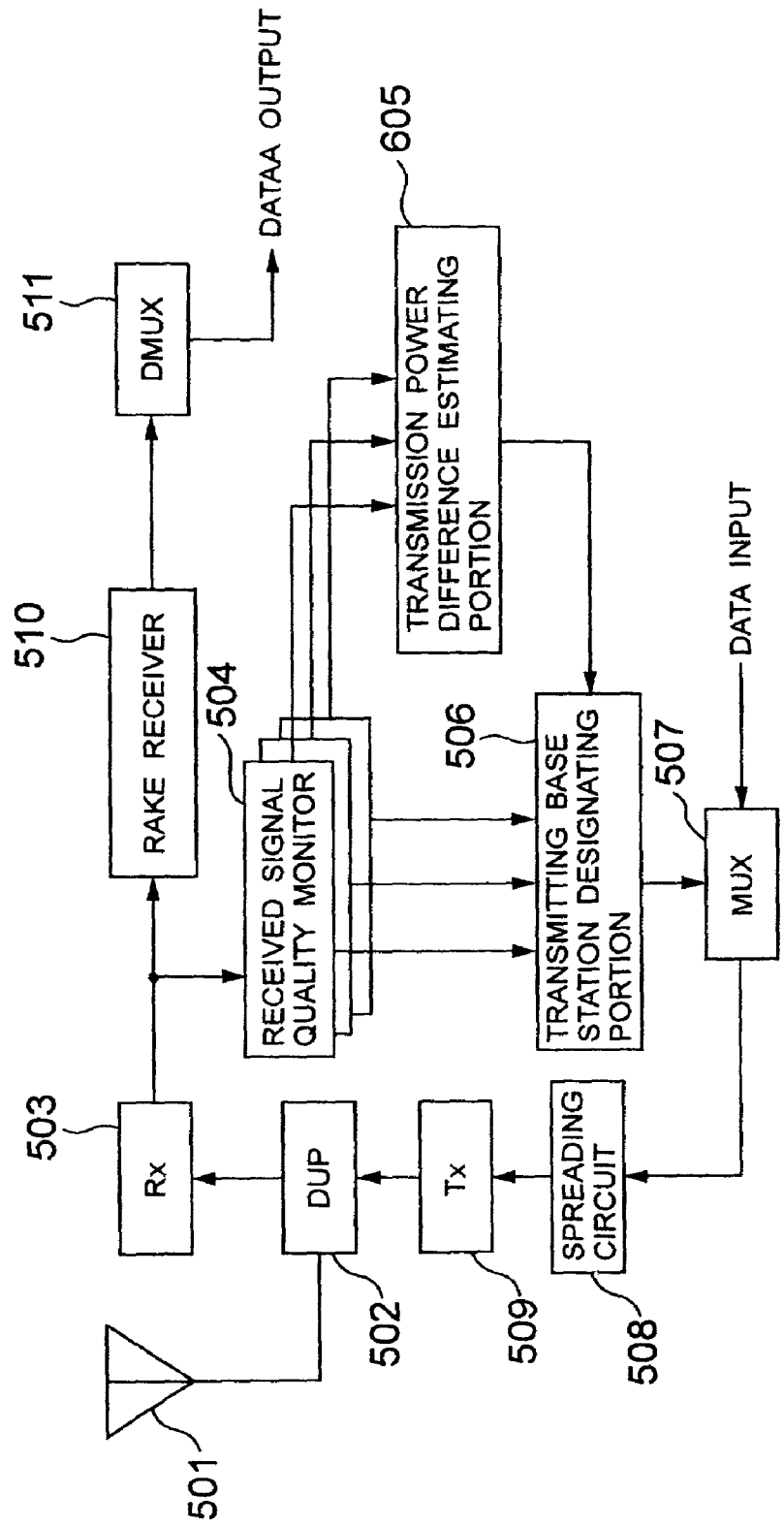
FIG. 5 is a block diagram showing a configuration of the mobile station according to a second embodiment of the invention.

FIG. 5 shows a configuration of the mobile station in the second embodiment of the invention, in which like or same parts are designated by the same numerals as in FIG. 3. The configuration of the mobile station in the second embodiment of the invention has a transmission power value estimating portion 605 for estimating a difference between the transmission power value of dedicated control signal at the transmitting base station and the predetermined maximum transmission power value of base station, instead of the handover base station transmission power difference estimating portion 505 provided in the mobile station according to the first embodiment of the invention.

The transmitting base station instructing portion 506 makes all of the handover base stations the transmitting base station, in the case where a difference between the transmission power value of dedicated data signal at the transmitting base station that is estimated in the transmission power difference estimating portion 605 and the maximum transmission power value of base station is within a predetermined threshold value, while it selects the transmitting base station in accordance with the received signal quality of common pilot signal that is measured, generates a signal indicating the transmitting base station and transmits it to the active set base station in the case where greater than the threshold value.

Figure 6:
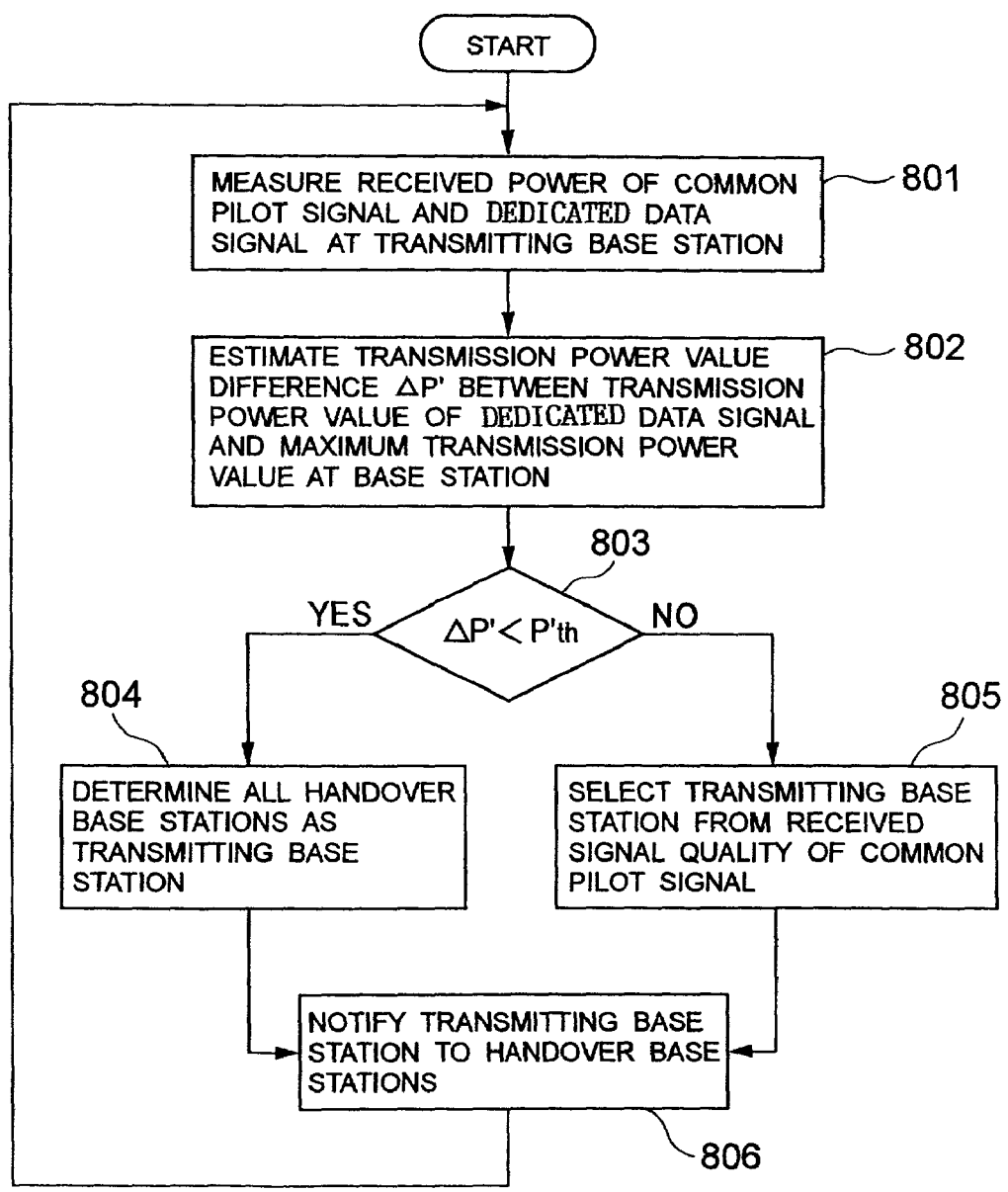
FIG. 6 is a flowchart showing an operation of the mobile station according to the second embodiment of the invention.

FIG. 6 is a flowchart showing an operation at the mobile station according to the second embodiment of the invention. A method of determining the transmitting base station at the mobile station that is performed at a predetermined interval will be described below.

First of all, the mobile station measures the received powers of common pilot signal and dedicated control signal transmitted from the transmitting base station (step 801). On the basis of the measured results, the transmission power value of dedicated data signal is estimated, and a transmission power value difference ΔP' from the maximum transmission power value of the base station that is known beforehand is estimated (step 802). If this estimated power value is within a threshold value $\Delta P'_{th}$ (step 803), all of the handover base stations are determined as the transmitting base station (step 804), or otherwise the transmitting base station is selected in accordance with the received signal quality of common pilot signal (step 805).

Thereafter, a signal indicating the determined transmitting base station is transmitted through an uplink, and notified to the handover base station (step 806). The mobile station performs the determination of the transmitting base station as described above, at a predetermined time interval.

Also, the base station setting the link receives a signal indicating the transmitting base station transmitted from the mobile station at predetermined time interval, in which if judging that the self station is the transmitting base station, it transmits a dedicated control signal and a dedicated data signal, while if judging that the self station is the non-transmitting base station, it transmits only the dedicated control signal.

In this way, according to this embodiment, in the case where the transmission power value of dedicated data signal transmitted by the transmitting base station is close to the predetermined maximum transmission power value of the base station, the dedicated data signal is enabled to transmit from all of the base stations setting the link, so that the transmission power value of dedicated data signal transmitted by the transmitting base station reaches the maximum transmission power value, and can not be increased anymore, whereby it is possible to avoid the received signal quality of dedicated data signal from degrading at the mobile station.

A third embodiment of the invention will be described below. A basic principle of the third embodiment of the invention is that in the case of the site selection diversity transmit power control system, there are some instances, as described in the second embodiment, where because there are a smaller number of base stations for making the transmission than in the soft handover, the target received signal quality may not be attained even if the maximum transmission power value of the base station is reached in an area with larger propagation loss, in which the transmission is enabled from all of the handover base stations, to suppress the degradation in the received signal quality at the mobile station.

Figure 7:
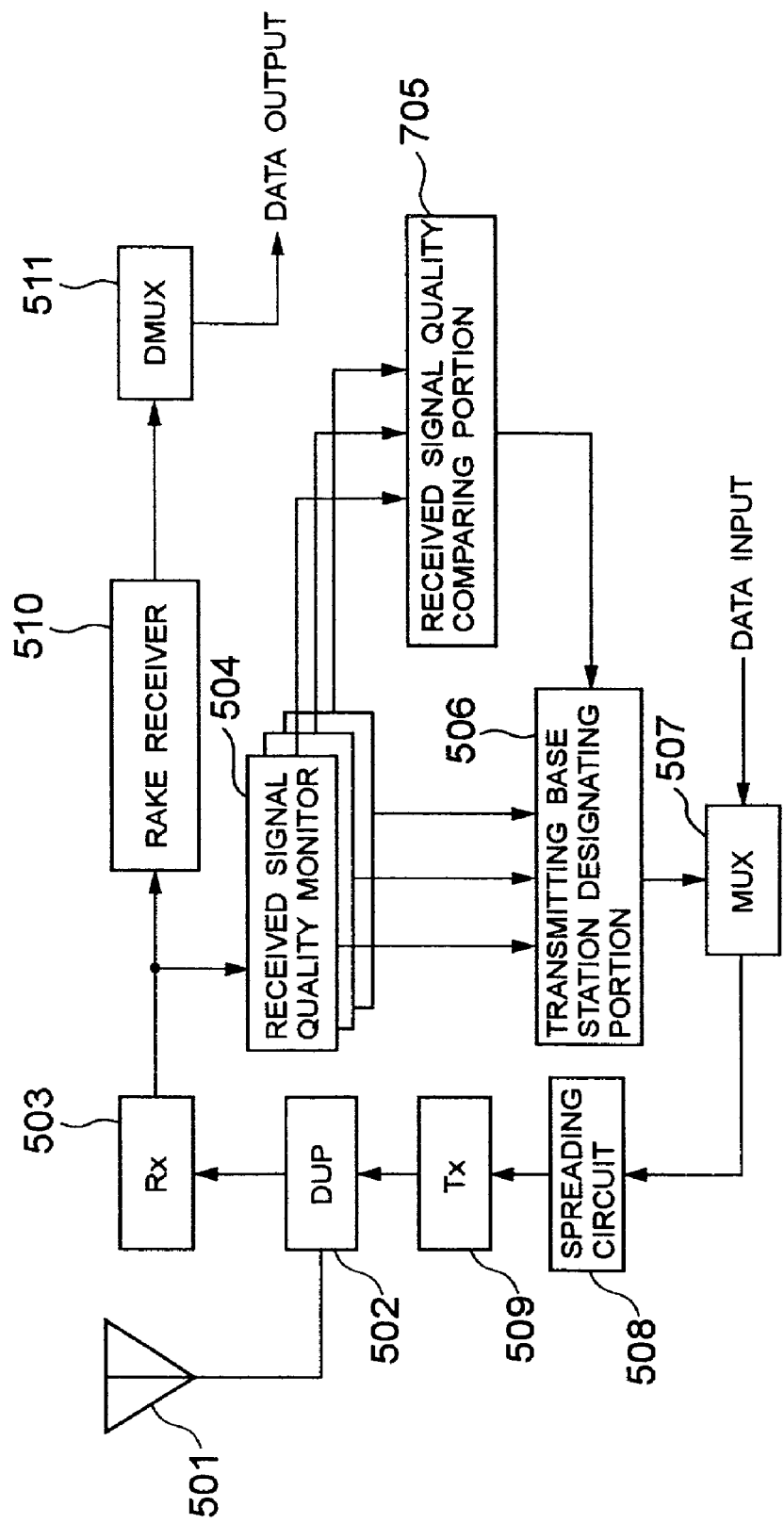
FIG. 7 is a block diagram showing a configuration of the mobile station according to a third embodiment of the invention.

FIG. 7 shows a configuration of the mobile station in the third embodiment of the invention, in which like or same parts are designated by the same numerals as in FIG. 3. The configuration of the mobile station in the third embodiment of the invention has a received signal quality comparing portion 705 for comparing the received signal quality of dedicated data signal measured by the received signal quality monitor 504 with a predetermined received signal quality target value, instead of the handover base station transmission power difference estimating portion 505 provided in the mobile station according to the first embodiment of the invention.

The transmitting base station instructing portion 506 makes all of the handover base stations the transmitting base station, in the case where the minimum received signal quality is not met as a result of comparison in the received signal quality comparing portion 705, while it selects the transmitting base station in accordance with the received signal quality of common pilot signal that is measured, generates a signal indicating the transmitting base station and transmits it to the base station setting the link, in the case where greater than or equal to the minimum received signal quality.

Figure 8:
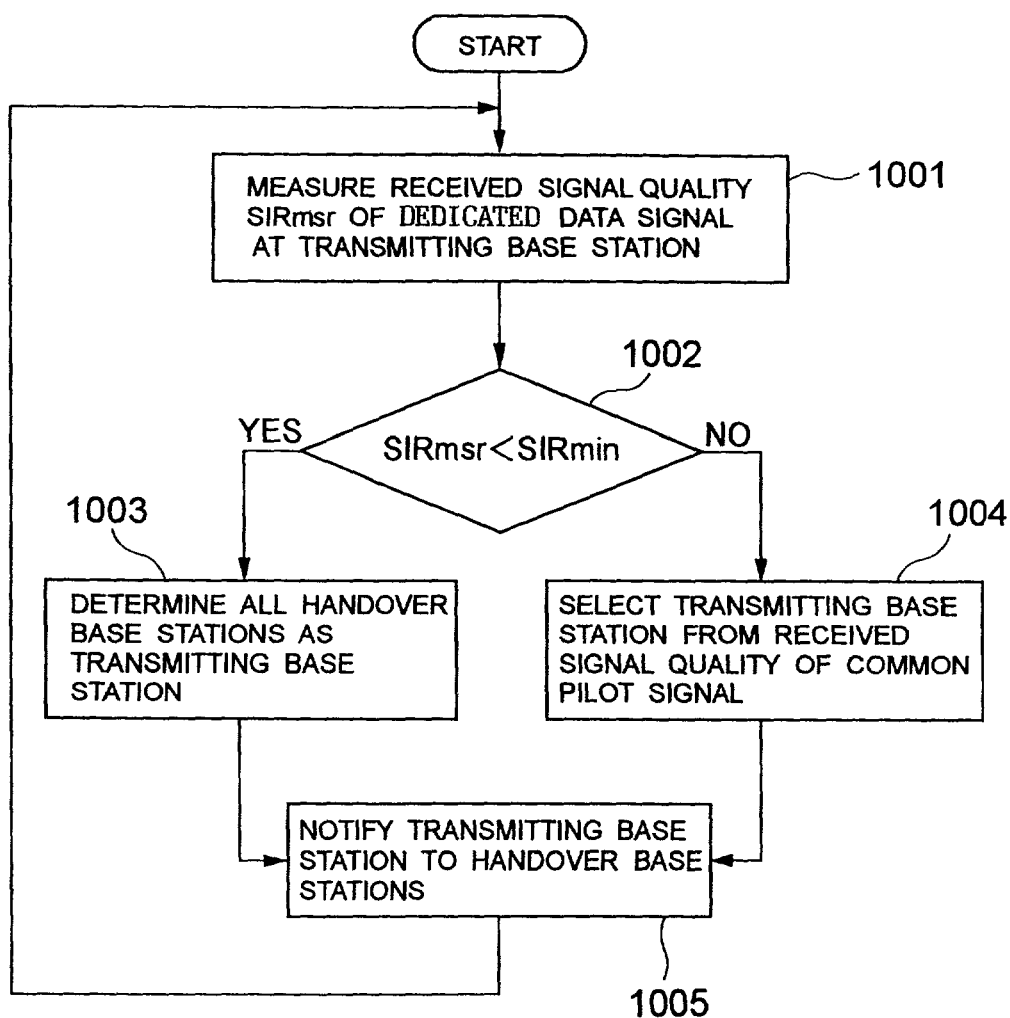
FIG. 8 is a flowchart showing an operation of the mobile station according to the third embodiment of the invention.
Figure 9:
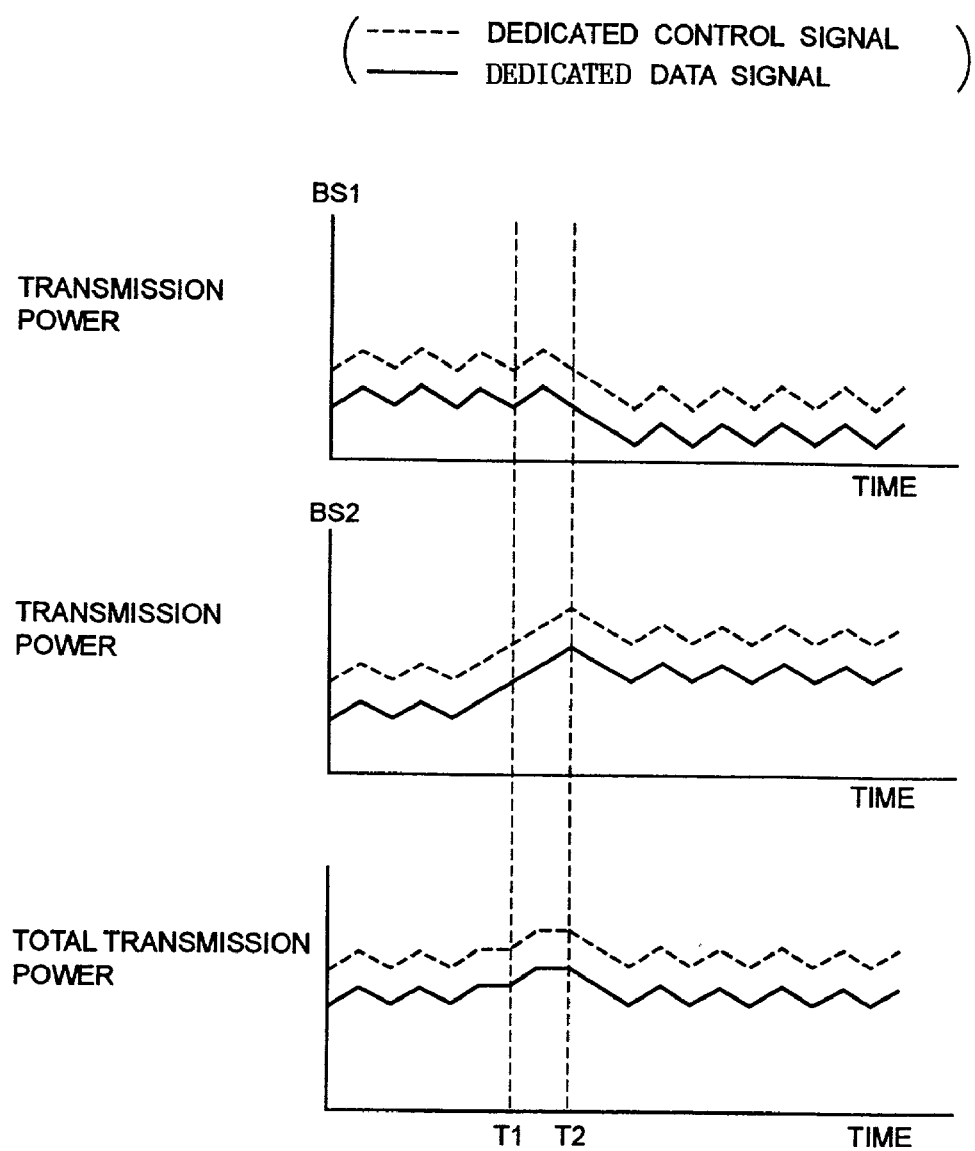
FIG. 9 is a graph showing a transition of the transmission power value of the dedicated data signal during a soft handover under the conventional transmission power control.
Figure 10:
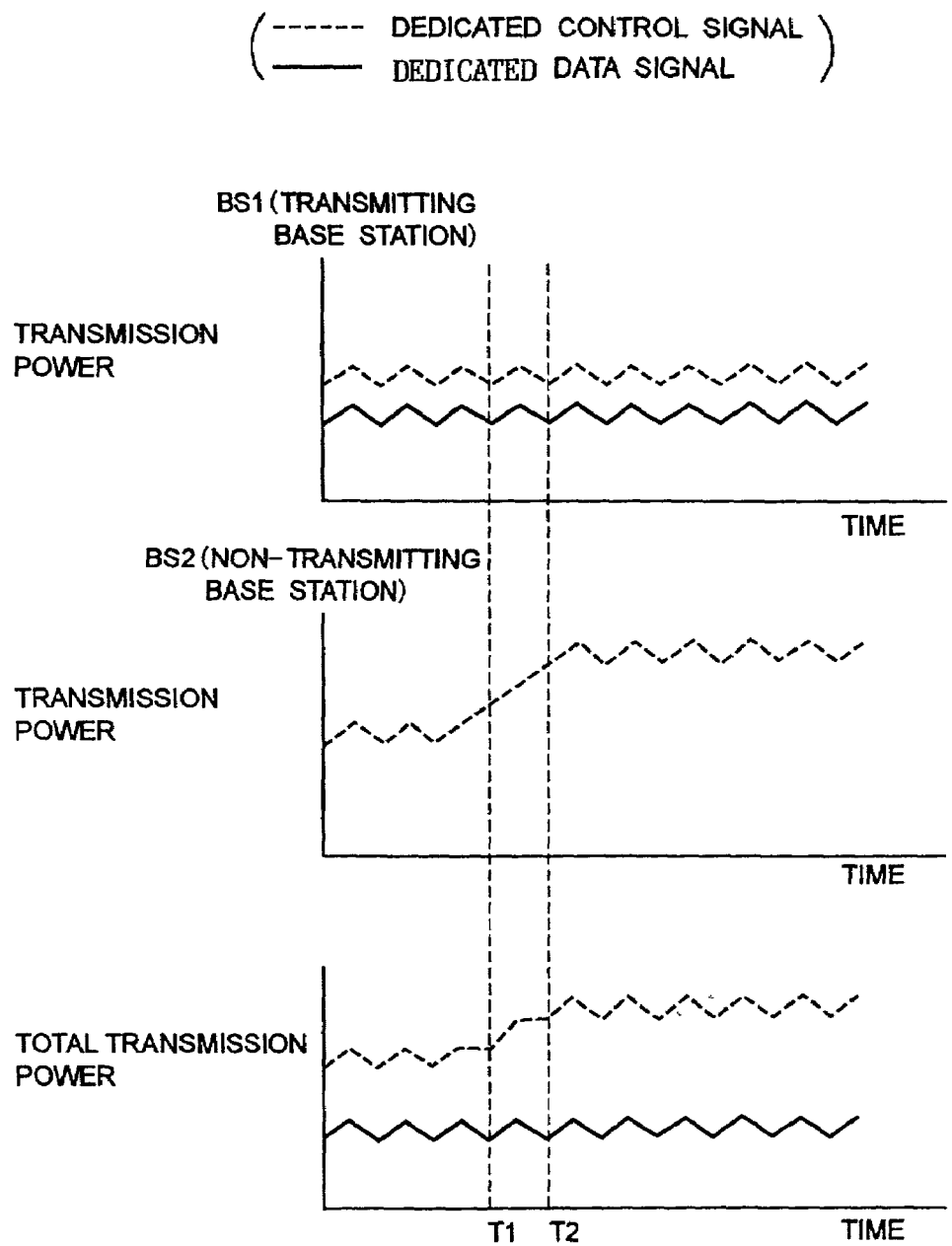
FIG. 10 is a graph showing a transition of the transmission power value of the dedicated data signal during the handover under the site selection diversity transmit power control system.

FIG. 8 is a flowchart showing the operation at the mobile station according to the third embodiment of the present invention. A method of determining the transmitting base station at the mobile station that is performed at a predetermined interval will be described below.

First of all, the mobile station measures the received signal quality of dedicated data signal transmitted from the transmitting base station (step 1001). This measured result $SIR_{msr}$ is compared with the minimum target value $SIR_{min}$ of predetermined received signal quality (step 1002), in which if $SIR_{msr}<SIR_{min}$, all of the handover base stations are determined as the transmitting base station (step 1003), while if $SIR_{msr}>SIR_{min}$, the transmitting base station is selected in accordance with the received signal quality of common pilot signal (step 1004).

Thereafter, a signal indicating the determined transmitting base station is transmitted through an uplink, and notified to the handover base station (step 1005). The mobile station performs the determination of the above transmitting base station at a predetermined time interval.

Also, the base station setting the link receives a signal indicating the transmitting base station transmitted from the mobile station at predetermined time interval, in which if judging that the self station is the transmitting base station, it transmits a dedicated control signal and a dedicated data signal, while if judging that the self station is the non-transmitting base station, it transmits only the dedicated control signal.

In this way, according to this embodiment, in the case where the transmission power value of dedicated data signal transmitted by the transmitting base station reaches the predetermined maximum transmission power value of the base station, and can not be increased anymore, therefore, in the case where the received signal quality at the mobile station can not be kept above the predetermined minimum target value, the dedicated data signal is enabled to transmit from all of the base stations setting the link, so that the received signal quality at the mobile station can be improved.

In the second embodiment as above described, as means for estimating the transmission power value of dedicated data signal at the base station, the dedicated data signal that is one of the two dedicated data signals is employed, but the dedicated control signal may be used.

As described above, according to the present invention, during the site selection diversity transmit power control are performed, if the transmission power value of the transmitting base station lies under a predetermined condition, all of the handover base stations are enabled to transmit the dedicated data signal, whereby the transmission power value of dedicated control signal at the non-transmitting base station is suppressed to increase , and the trafic capacity is increased. Moreover, the received signal quality can be increased in the case where the transmission power value of dedicated data signal from the transmitting base station reaches the maximum transmission power value of the base station.

What is claimed is:

1. A mobile communication control method in which a mobile station transmits data using at least one currently transmitting base station and also sets a link with base stations forming an active set of base stations, comprising:
    measuring a received signal quality of a pilot signal transmitted from each of said active set of base stations;
    determining at least one transmitting base station from among the active set of base stations in accordance with the measured results, said determining further comprises enabling for transmission all of the active set base stations depending on a state of transmission power value from said at least one currently transmitting base station;
    transmitting a dedicated control signal to said mobile station from said active set of base stations;
    transmitting a dedicated data signal to said mobile station from said at least one currently transmitting base station;
    estimating a transmission power value of the dedicated control signal transmitted by said active set of base stations, and
    making each of the active set of base stations a transmitting base station when an estimated value of the transmission power value of the dedicated control signal transmitted by the active set of base stations other than said at least one currently transmitting base station is greater than or equal to a predetermined threshold value for the estimated value of transmission power value of the dedicated control signal transmitted by at least one currently transmitting base station.

2. The mobile communication control method according to claim 1, further comprising a step of measuring the received powers of a common pilot signal that said active set base station transmits at a predetermined power value and said dedicated control signal or said dedicated data signal transmitted at a power value under the transmission power control in said mobile station, and estimating a power value of said dedicated control signal or said dedicated data signal from a difference between the received power of said common pilot signal and the received power of said dedicated control signal or said dedicated data signal.

3. The mobile communication control method according to claim 1, wherein each of the active set of base stations transmits a dedicated control signal to the mobile station and wherein only each of said at least one transmitting base station transmits dedicated data signal to the mobile station.

4. The mobile communication control method according to claim 1, further comprising notifying the active set of base stations of the determined at least one transmitting base station.

5. A mobile communication control method in which a mobile station transmits data using at least one currently transmitting base station and also sets a link with base stations forming an active set of base stations, comprising:
    measuring a received signal quality of a pilot signal transmitted from each of said active set of base stations;
    determining at least one transmitting base station from among the active set of base stations in accordance with the measured results, said determining further comprises enabling for transmission all of the active set base stations depending on a state of transmission power value from said at least one currently transmitting base station;
    transmitting a dedicated data signal to said mobile station from said at least one currently transmitting base station;
    estimating a transmission power value of the dedicated data signal transmitted by said at least one currently transmitting base station, and
    making each of the active set of base stations a transmitting base station when a difference between an estimated value of the transmission power value of said at least one currently transmitting base station and a predetermined maximum transmission power value of base station is smaller than or equal to a predetermined threshold value.

6. A mobile communication method in which a mobile station transmits data using at least one currently transmitting base station and also sets a link with base stations forming an active set of base stations, comprising:
    measuring a received signal quality of a pilot signal transmitted from each of said active set of base stations;
    determining at least one transmitting base station from among the active set of base stations in accordance with the measured results, said determining further comprises enabling for transmission all of the active set base stations depending on a state of transmission power value from said at least one currently transmitting base station;
    measuring the received signal quality of the dedicated data signal transmitted from said at least one currently transmitting base station in said mobile station, and making all of the active set base stations a transmitting base station when the received signal quality is less than a predetermined signal quality even if said at least one currently transmitting base station makes the transmission at the predetermined maximum transmission power value.

7. A mobile communication system comprising:
a mobile station;
at least one currently transmitting base station transmitting data to and from the mobile station; and
base stations with which the mobile station sets a link, forming an active set of base stations,
wherein the mobile station measures a received signal quality of a pilot signal transmitted from each of said base stations, determines at least one transmitting base station from the active set of base stations in accordance with the measured results,
wherein the determining of the at least one transmitting base comprises enabled for transmission all of the active set of base stations depending on a state of transmission power value from said at least one currently transmitting base station,
wherein said active set of base stations transmits a dedicated control signal to said mobile station, said at least one currently transmitting base station transmits a dedicated data signal and the dedicated control signal, and said mobile station estimates a transmission power value of the dedicated control signal transmitted by said active set of base stations, and
wherein each base station from the active set of base stations are enabled for transmission when an estimated value of the transmission power value of the dedicated control signal transmitted by the active set of base stations other than said at least one currently transmitting base station is greater than or equal to a predetermined threshold value for the estimated value of transmission power value of the dedicated control signal transmitted by said at least one currently transmitting base station.

8. The mobile communication system according to claim 7,
wherein said mobile station measures the received powers of a common pilot signal that said active set base station transmits at a predetermined power value and said dedicated control signal or said dedicated data signal transmitted at a power value under the transmission power control, and estimates a power value of said dedicated control signal or said dedicated data signal from a difference between the received power of said common pilot signal and the received power of said dedicated control signal or said dedicated data signal.

9. The mobile communication system according to claim 7, wherein said mobile station notifies the determined result to said active set base stations.

10. A mobile communication system comprising:
a mobile station;
at least one currently transmitting base station transmitting data to and from the mobile station; and
base stations with which the mobile station sets a link, forming an active set of base stations,
wherein the mobile station measures a received signal quality of a pilot signal transmitted from each of said base stations, determines at least one transmitting base station from the active set of base stations in accordance with the measured results,
wherein the determining of the at least one transmitting base comprises enabled for transmission all of the active set of base stations depending on a state of transmission power value from said at least one currently transmitting base station,
wherein said at least one currently transmitting base station transmits a dedicated data signal to said mobile station, and said mobile station estimates a transmission power value of the dedicated data signal transmitted by said at least one currently transmitting base station, and
wherein each base station of the active set of base stations is enabled for transmission, if a difference between an estimated value of the transmission power value of said at least one currently transmitting base station and a predetermined maximum transmission power value of base station is smaller than or equal to a predetermined threshold value.

11. A mobile communication system comprising:
a mobile station;
at least one currently transmitting base station transmitting data to and from the mobile station; and
base stations with which the mobile station sets a link, forming an active set of base stations,
wherein the mobile station measures a received signal quality of a pilot signal transmitted from each of said base stations, determines at least one transmitting base station from the active set of base stations in accordance with the measured results,
wherein the determining of the at least one transmitting base comprises enabled for transmission all of the active set of base stations depending on a state of transmission power value from said at least one currently transmitting base station,
wherein said mobile station measures the received signal quality of a signal transmitted from said at least one currently transmitting base station, and
all of the active set of base stations are enabled for transmission when the received signal quality is less than a predetermined signal quality even if said at least one currently transmitting base station makes the transmission at a predetermined maximum transmission power value.

12. A mobile station which transmits data using at least one currently transmitting base station and which sets a link with base stations forming an active set of base stations, comprising:
means for measuring received signal quality of a pilot signal transmitted from said base stations; and
means for determining at least one transmitting base station from the active set of base stations in accordance with the measured results,
wherein said determining at least one transmitting base station further comprises enabling for transmission each base station from the active set of base stations depending on a state of transmission power value of said at least one currently transmitting base station, and
wherein said mobile station estimates a transmission power value of the dedicated control signal transmitted by said active set of base stations, and notifies that all base stations of the active set of base stations are enabled for transmission when an estimated value of the transmission power value of said dedicated control signal transmitted by the active set of base stations other than said at least one currently transmitting base station is greater than or equal to a predetermined threshold value for the estimated value of transmission power value of the dedicated control signal transmitted by said at least one currently transmitting base station.

13. The mobile station according to claim 12,
wherein said mobile station measures the received powers of a common pilot signal that said active set base station transmits at a predetermined power value and said dedicated control signal or said dedicated data signal transmitted at a power value under the transmission power control, and estimates a power value of said dedicated control signal or said dedicated data signal from a difference between the received power of said pilot signal and the received power of said dedicated control signal or said dedicated data signal.

14. The mobile station according to claim 12, further comprising means for notifying the determined result to said active set of base stations.

15. A mobile station which transmits data using at least one currently transmitting base station and which sets a link with base stations forming an active set of base stations, comprising:
　means for measuring received signal quality of a pilot signal transmitted from said base stations; and
　means for determining at least one transmitting base station from the active set of base stations in accordance with the measured results,
　wherein said determining at least one transmitting base station further comprises enabling for transmission each base station from the active set of base stations depending on a state of transmission power value of said at least one currently transmitting base station, and
　wherein said mobile stations estimates a transmission power value of the dedicated data signal transmitted by said at least one currently transmitting base station, and notifies that each base station from the active set of base stations are enabled for transmission when a difference between an estimated value of the transmission power value of said at least one currently transmitting base station and predetermined maximum transmission power value of base station is smaller than or equal to a predetermined threshold value.

16. A mobile station which transmits data using at least one currently transmitting base station and which sets a link with base stations forming an active set of base stations, comprising:
　means for measuring received signal quality of a pilot signal transmitted from said base stations; and
　means for determining at least one transmitting base station from the active set of base stations in accordance with the measured results,
　wherein said determining at least one transmitting base station further comprises enabling for transmission each base station from the active set of base stations depending on a state of transmission power value of said at least one currently transmitting base station, and
　wherein said mobile station measures the received signal quality of a signal transmitted from said at least one currently transmitting base station, and notifies that all of the active set base stations are enabled for transmission when the received signal quality is less than a predetermined signal quality even if said at least one currently transmitting base station makes the transmission at predetermined maximum transmission power value.

* * * * *